June 13, 1961 J. H. GIVEN 2,987,768
METHOD AND APPARATUS FOR EXTRUDING PLASTIC CONDUIT
Filed March 25, 1959 4 Sheets-Sheet 1

INVENTOR
JOSEPH H. GIVEN
BY Schmieding and Fultz
ATTORNEYS

June 13, 1961 J. H. GIVEN 2,987,768
METHOD AND APPARATUS FOR EXTRUDING PLASTIC CONDUIT
Filed March 25, 1959 4 Sheets-Sheet 2
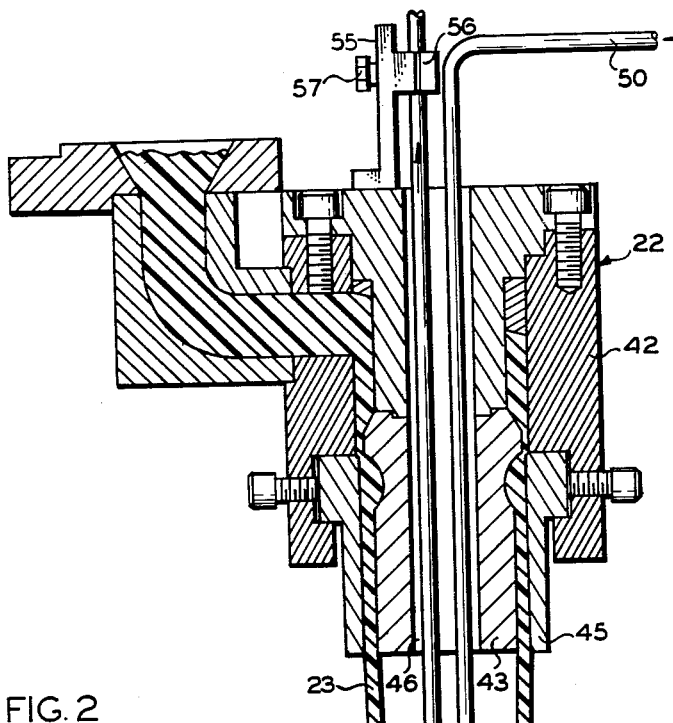
FIG. 2
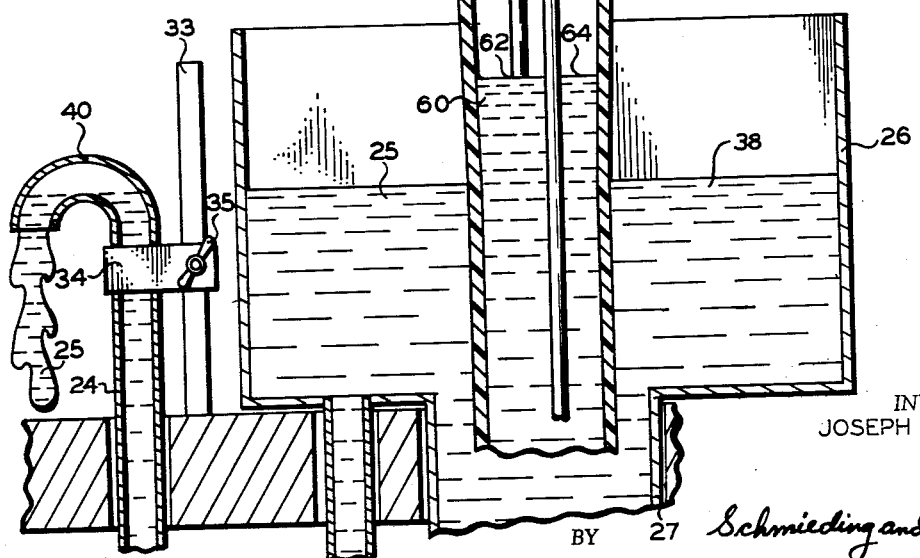
INVENTOR
JOSEPH H. GIVEN
BY Schmieding and Fultz
ATTORNEYS June 13, 1961 J. H. GIVEN 2,987,768
METHOD AND APPARATUS FOR EXTRUDING PLASTIC CONDUIT
Filed March 25, 1959 4 Sheets-Sheet 3

INVENTOR
JOSEPH H. GIVEN

BY *Schmieding and Fultz*
ATTORNEYS

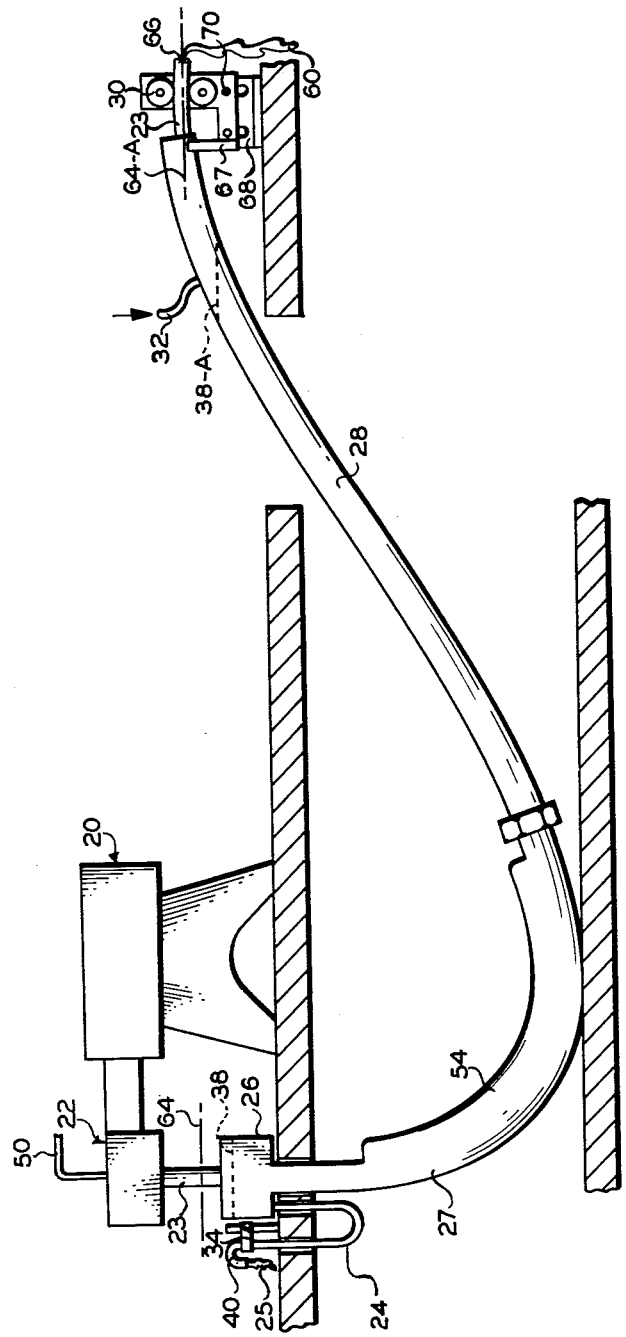

United States Patent Office 2,987,768
Patented June 13, 1961

2,987,768
METHOD AND APPARATUS FOR EXTRUDING PLASTIC CONDUIT
Joseph H. Given, Columbus, Ohio, assignor to The Plastex Company, Columbus, Ohio, a corporation of Ohio
Filed Mar. 25, 1959, Ser. No. 801,896
5 Claims. (Cl. 18—14)

This application relates to method and apparatus for producing plastic conduit by extrusion.

In general, the apparatus of the present invention includes a conventional extruding machine for continuously supplying a flow of plastic material to a die means provided with a vertically downwardly facing die outlet. The die means shapes the flowing plastic material into conduit form and discharges same into a coolant bath. The moving conduit continuously progresses downwardly through said bath and thence upwardly and out of the bath to a station where the conduit is coiled and packaged for use. The coolant bath surrounds the moving plastic conduit for a relatively long extent thereof and is relatively deep whereby rapid and highly efficient cooling is continuously applied to the moving plastic conduit. A plurality of rollers is provided at the exit of the bath for continuously and adjustably applying tension to the moving plastic conduit.

In accordance with the present invention, the interior of the moving plastic conduit, as it moves through the above described bath, is maintained full of coolant liquid which balances the inwardly directed hydrostatic force exerted on the outer wall of the conduit by the relatively deep surrounding bath. The conduit is thereby prevented from collapsing as it is cooled.

The apparatus of the present invention includes novel means for varying the surface level of the coolant bath surrounding the conduit and also the surface level of the coolant within the conduit relative to the location of the outlet of the die means. By varying the surface level of the coolant bath, surrounding the conduit, the predetermined required outside diameter for the conduit can be readily and accurately established. Moreover, when the previously mentioned tension applied to the conduit beyond the bath, is varied, in combination with varying the surface level of the coolant surrounding the conduit, then both the predetermined required outside diameter and wall thickness of the conduit can be readily and accurately established and maintained.

In operating the apparatus of the present invention it has been found that if the surface level of the coolant within the conduit is maintained higher than the surface level of the coolant bath, surrounding the conduit, a pre-cooling effect is imposed on the flowing plastic conduit prior to its entry into the main coolant bath. This prevents the flowing plastic material from being suddenly subjected to an extreme change in temperature with the result that a superior exterior wall surface finish is obtained.

It is therefore an object of the present invention to provide apparatus for producing plastic conduit which apparatus includes novel means for more rapidly and efficiently cooling the conduit whereby the flow rate for production thereof is greatly increased.

It is another object of the present invention to provide apparatus for producing plastic conduit which apparatus includes novel means for readily and accurately establishing the precise diameter of the plastic conduit being formed. Hence the extruding machine can be rapidly retooled for the production of a different size of conduit with the result that the non-production time of the machine is greatly reduced.

It is another object of the present invention to provide apparatus for producing plastic conduit which includes means for pre-cooling the flowing conduit prior to its entry into a main coolant bath whereby a superior wall finish in obtained.

It is another object of the present invention to provide an apparatus for producing plastic conduit which apparatus includes novel means for readily and accurately establishing both the diameter and wall thickness of the plastic conduit being formed.

Further objects and advantages of the present invention will be apparent from the following description, reference being had to the accompanying drawings wherein preferred forms of embodiments of the invention are clearly shown.

In the drawing:

FIG. 2 is a side sectional view of a die means comprising a portion of the apparatus of FIG. 1;

FIG. 4 is a side elevational view of a modified apparatus for producing plastic conduit, said apparatus being constructed in accordance with the present invention and comprising a second aspect thereof.

Figure 1:
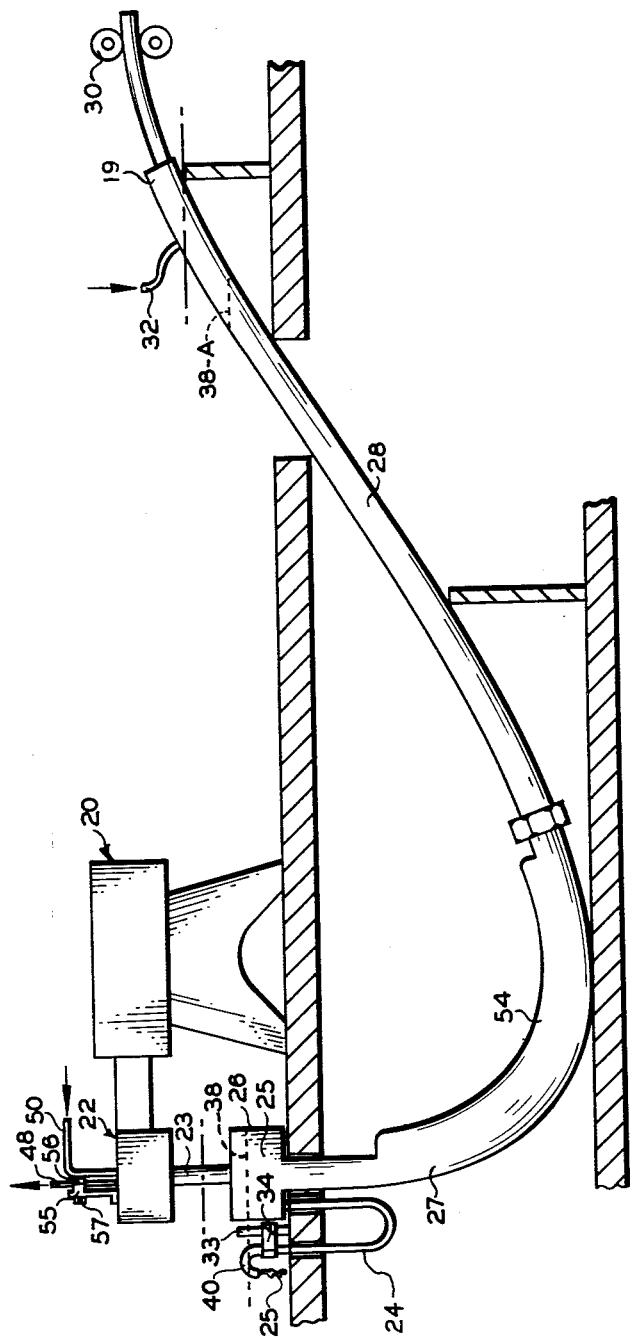
FIG. 1 is a side elevational view of an apparatus for producing plastic conduit, said apparatus being constructed in accordance with the present invention.

Referring in detail to the drawing the apparatus of the present invention includes a conventional extruding machine, indicated generally at 20, which is of a type well known to the art, and serves to continuously supply a flow of plastic material to a die means indicated generally at 22. The die means shapes the flowing plastic material into conduit form as seen at 23 in FIG. 1, and the flowing conduit passes downwardly into a coolant bath 25 contained in a container 26 and pipe sections 27 and 28.

The moving pipe 23 emerges from the bath 25 at an exit end 26 of conduit section 28 and is engaged by a plurality of driven rollers 30 which frictionally engage the walls of the conduit. The speed of rotation of rollers 30 can be precisely and variably controlled, by means of a suitable variable speed drive, to provide means for adjustably varying the tension being continuously applied to the moving plastic conduit.

Coolant bath 25 is continuously supplied with a flow of coolant through an intake line 32 and a flow of coolant 25 is continuously withdrawn from the coolant bath through a vertically adjustable flexible hose 24. Hose 24 is vertically adjustably secured to an upright member 33 by a clamping bracket 34 provided with a thumb screw 35. It will be understood that the level of the surface 38 of coolant bath 25 is determined by the vertical location of horizontal hose portion 40. When horizontal hose portion 40 is moved upwardly the surface level 38 of bath 25 is raised, and conversely, when horizontal hose portion 40 is lowered surface level 38 is moved downwardly. Surface level 38-A at the outlet 19 of pipe section 28 will of course be the same as surface level 38 in container 26.

Figure 3:
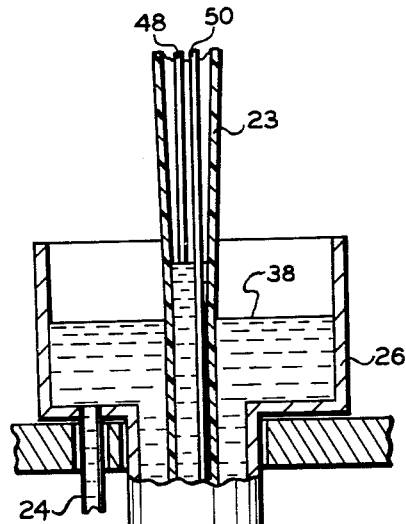
FIG. 3 is a partial side elevational view of a container and coolant bath comprising a portion of the apparatus of FIG. 1.
Figure 3:
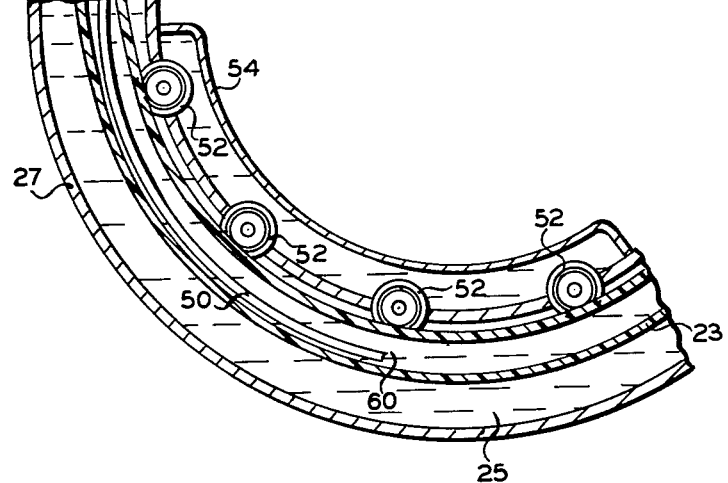

Reference is next made to FIGS. 2 and 3 which illustrate the interior details of the previously mentioned die means 22. The die means include a body portion 42 and a removable mandrel portion 43 that form a die outlet 45. Mandrel portion 43 includes a bore 46 through which are extended a vacuum line 48 and a water intake line 50. As seen in FIG. 3 water intake line 50 extends to the bottom of pipe section 27 and serves to continuously supply a flow of cold coolant to the bottom portion of a bath 60 within the walls of conduit 23. As the coolant is heated by contact with the relatively warm moving plastic conduit 23 it will rise towards the surface of the bath and thereby provide circulation within the bath.

A plurality of rollers 52 are spaced along the curved portion of pipe section 27 to prevent frictional engagement of conduit 23 with the inner wall of pipe section 27. A jacket 54 prevents the escape of coolant from between the rollers and the edges of the openings in which the rollers are mounted.

The upper end of vacuum line 48 is mounted to a bracket 55 by means of a screw clamp 56. Vacuum line 48 can be raised and lowered by loosening and then retightening threaded element 57.

Since water is continuously being removed from bath 60 at a lower end 62 of vacuum line 48 it will be understood that the level of lower end 62 of vacuum line 48 will establish the surface level 64 of bath 60 within the conduit 23.

Reference is next made to FIG. 4 which shows an apparatus which comprises a modification of the apparatus of the preceding figures. Components of the apparatus of FIG. 4 which are identical of the preceding figures are designated by identical numerals.

The apparatus of FIG. 4 differs from that of the apparatus of the preceding figures in that the vacuum line 48, extending downwardly through mandrel 43, is eliminated and coolant from bath 60, within the moving plastic conduit, is continuously drained from an open end 66 of conduit 23 and the surface level 64 of bath 60 is varied by raising and lowering the end 66 of conduit 23. It will be understood that the surface level 64, in the bath portion 60 underlying the die means, FIG. 2, will be the same as the surface level 64-A of the discharge stream leaving the open end 66 of conduit 23, FIG. 4.

With continued reference to FIG. 4 the right end of pipe section 28 and hence the open end 66 of conduit 23 can be raised and lowered by raising and lowering an adjustable support and roller assembly 67 which is mounted on a stationary bracket 68. Threaded members 70 serve to clamp support 67 to bracket 68 at various positions of vertical adjustment to provide means for vertically adjusting the level 64-A of outlet stream 70 and hence the level 64 of bath 60 within the plastic conduit 23.

With continued reference to FIG. 4 coolant for bath 60 within conduit 23 is continuously supplied by a water intake line 50 extended downwardly through the bore 46 in mandrel portion 43 of a die means, see FIG. 2.

In operation of the apparatus of FIGS. 1 through 3, plastic material is caused to continuously flow through die means 22 and outwardly through die outlet 45. A series of driven rollers, two of which are shown at 30, continuously apply tension to the flowing plastic conduit whereby the flowing conduit assumes a downwardly and inwardly tapered configuration between die outlet 45 and the surface 38 of bath 25, as seen in FIG. 2. The moving plastic conduit 23 progresses downwardly through bath 25 in container 26 and pipe sections 27 and 28 and thence outwardly through discharge end 19.

After an extruding operation has been started, the operator measures the finished outside diameter of plastic conduit 23 to determine if it is running oversize or undersize. The wall thickness of the conduit is also checked for thickness.

If the diameter of conduit 23 is undersize surface level 38 of bath 25 is raised to cause the converging downwardly flowing conduit to setup closer to outlet 45 of die means 22 whereby the diameter of the conduit is increased.

If the conduit is running oversize surface level 38 of bath 25 is lowered to cause the downwardly converging conduit to setup at a greater distance from outlet 45 of the die means.

In varying surface level 38 threaded element 35 of clamp 34 is loosened to permit horizontal portion 40 of hose 24 to be moved and locked in a higher or lower position as required.

It is desirable to adjust surface level 64 of coolant bath 60 at a level higher than surface level 38 of the surrounding coolant bath in order to partially cool the downwardly flowing conduit 23 prior to its entry into surrounding coolant bath 25. This prevents the warm flowing plastic material from being suddenly subjected to an extreme change in temperature with the result that a much better exterior wall surface finish is obtained. The distance at which surface level 64 should be located above surface level 38 depends on the particular type of plastic composition being extruded. Hence, when it is desired to extrude a different type of material, it becomes necessary to vary the surface level 64 relative to surface level 38 in order to achieve the ultimate in exterior wall surface finish.

Surface level 64 of bath 60 is raised or lowered, as required, by loosening threaded element 57 of clamp 56 which frees vacuum line 48 so that it can be adjusted upwardly and downwardly as required.

When it is desired to vary the wall thickness of the flowing conduit 23, the speed of rotation of tension rollers 30 is increased to decrease the wall thickness or decreased to increase the wall thickness. After the wall thickness has been adjusted it is usually necessary to raise or lower surface level 38 of coolant bath 25 to cause the flowing conduit to setup at the proper outside diameter. Surface level 64 of inner coolant bath 60 is then adjusted to provide the proper amount of precooling applied to the flowing conduit prior to its entry into coolant bath 25.

Reference is next made to FIG. 4 that illustrates a modification of the apparatus of FIG. 1 which comprises a second aspect of the present invention.

In the operation of the apparatus of FIG. 4, surface level 38 of bath 25 is varied by raising lowering hose 40 in the manner previously described in connection with FIG. 1.

Surface level 64 of bath 60, however, is varied by raising and lowering support and roller assembly 67 on its supporting bracket 68. This raises or lowers surface level 64-A of the flowing stream of coolant 60 being discharged from the end of the plastic conduit at 66 which serves to raise and lower surface level 64 in the flowing conduit beneath die means 22.

It will be understood that with the apparatus of FIG. 4, the outside diameter, wall thickness, and superior surface finish can be controlled by varying the surface levels and magnitude of tension applied by rollers 30 in the manner previously described in connection with the apparatus of FIGS. 1 through 3.

While the forms of embodiments of the present invention as herein disclosed constitute preferred forms, it is to be understood that other forms might be adopted, all coming within the scope of the claims which follow:

I claim:

1. The steps in the method of producing plastic conduit which method comprises flowing plastic material through a die means to form a cylindrical conduit of plastic material; passing said conduit through a liquid bath wherein said liquid surrounds said conduit to a predetermined level and forms a cooling zone; continuously supplying colder coolant liquid to the interior of said conduit at a location therein below and remote from the surface of said liquid bath; continuously withdrawing warmer coolant liquid from within said conduit at a location therein above the surface of said liquid bath; applying tension to said conduit beyond the location of the entry of said conduit into said bath; varying the distance between certain of said predetermined levels and said die means to cause said conduit to assume a predetermined diameter; and varying said tension to cause said conduit to assume a predetermined wall thickness.

2. An apparatus for producing plastic conduit, said apparatus comprising, in combination, die means including a mandrel forming an annular die outlet; means for continuously flowing plastic material through said die means; a container of liquid coolant beyond said die outlet in surrounding relationship with said plastic conduit; a first tube extended into a lower region in said conduit and connected with a source of coolant liquid for supplying colder coolant liquid to the interior of said conduit; a second tube extending into an upper region in said conduit for withdrawing warmer coolant liquid from the interior of said conduit to maintain a predetermined level therein, said second tube including an inlet located at and establishing said predetermined level; means for applying tension to said plastic conduit beyond the surface of said liquid coolant; and means for varying the location of the outlet of said second tube for varying said predetermined level of said coolant within said conduit.

3. An apparatus for producing plastic conduit, said apparatus comprising, in combination, die means including a mandrel forming an annular die outlet; means for continuously flowing plastic material through said die means; a container of liquid coolant beyond said die outlet in surrounding relationship with said plastic conduit; a first tube extended through said mandrel and connected with a source of coolant liquid for supplying said liquid to the interior of said conduit, said first tube including an outlet within said conduit and located at a depth below the liquid coolant in said container for supplying colder coolant to the lower regions of said conduit; a second tube extending through said mandrel for withdrawing warmer coolant liquid from the interior of said conduit to maintain a predetermined level therein, said second tube including an inlet located at and establishing said predetermined level; means for applying tension to said plastic conduit beyond the surface of said liquid coolant; and means for varying the location of the outlet of said second tube for varying said predetermined level of said coolant within said conduit.

4. An apparatus for producing plastic conduit, said apparatus comprising, in combination, die means including a mandrel forming an annular die outlet; means for continuously flowing plastic material through said die means; a container of liquid coolant beyond said die outlet for surrounding a downwardly extending portion of said conduit flowing into said bath and an upwardly extending portion of said conduit flowing out of said bath; means for continuously supplying liquid coolant to the interior of said plastic conduit to oppose the inwardly directed hydrostatic force exerted by said liquid coolant surrounding said conduit; means for draining coolant from an end portion of said conduit beyond said upwardly extending portion; means for varying the elevation of the coolant in said end portion of said conduit whereby the elevation of the coolant in said downwardly extending portion of said conduit can be selectively varied.

5. The steps in the method of producing plastic conduit which method comprises flowing plastic material through a die means to form a cylindrical conduit of plastic material; passing said conduit through a liquid bath wherein said liquid surrounds said conduit to a predetermined level and forms a cooling zone; continuously supplying colder coolant liquid to the interior of said conduit at a location therein below and remote from the surface of said liquid bath; continuously withdrawing warmer coolant liquid from within said conduit at a location therein above the surface of said liquid bath, the liquid level within said conduit being maintained above the liquid level of said bath to pre-cool said conduit prior to its entry into said bath; withdrawing said conduit from said bath; and applying tension to said conduit beyond the location of the entry of said conduit into said bath.

References Cited in the file of this patent
UNITED STATES PATENTS

| | | |
|---|---|---|
| 2,097,684 | Atkinson | Nov. 2, 1937 |
| 2,409,521 | Wiley | Oct. 15, 1946 |
| 2,452,080 | Stephenson | Oct. 26, 1948 |
| 2,476,140 | Francis | July 12, 1949 |
| 2,634,459 | Irons | Apr. 14, 1953 |